Jan. 4, 1944.   E. GATEWOOD   2,338,377
PERPETUAL CALENDAR
Filed June 6, 1939   6 Sheets-Sheet 1

Inventor
ELBRIGE GATEWOOD
by his attorneys
Howson and Howson

Jan. 4, 1944.　　　　　E. GATEWOOD　　　　　2,338,377
PERPETUAL CALENDAR
Filed June 6, 1939　　　6 Sheets-Sheet 2

Fig. 15.

| JULY | LP. YR. ONLY JANUARY | APRIL | | |
|---|---|---|---|---|
| DECEMBER | DECEMBER | SEPTEMBER | | |
| | | JUNE | | |
| MARCH | MARCH | NOVEMBER | | EXCEPT LP.YR. FEBRUARY |
| AUGUST | AUGUST | | LP.YR. ONLY FEBRUARY | |
| MAY | MAY | | | |
| OCTOBER | EXCEPT LP.YR. JANUARY | | | |

| 05 | 11 | 16 | 22 | 33 | 39 | 44 | 50 | 61 | 67 | 72 | 78 | 89 | 95 | |
|---|---|---|---|---|---|---|---|---|---|---|---|---|---|---|
| 04 | 10 | 21 | 27 | 32 | 38 | 49 | 55 | 60 | 66 | 77 | 83 | 88 | 94 | |
| 09 | 15 | 20 | 26 | 37 | 43 | 48 | 54 | 65 | 71 | 76 | 82 | 93 | 99 | |
| 03 | 08 | 14 | 25 | 31 | 36 | 42 | 53 | 59 | 64 | 70 | 81 | 87 | 92 | 98 |
| 02 | 13 | 19 | 24 | 30 | 41 | 47 | 52 | 58 | 69 | 75 | 80 | 86 | 97 | |
| 01 | 07 | 12 | 18 | 29 | 35 | 40 | 46 | 57 | 63 | 68 | 74 | 85 | 91 | 96 |
| 00 | 06 | 17 | 23 | 28 | 34 | 45 | 51 | 56 | 62 | 73 | 79 | 84 | 90 | |

Fig. 16.

| | | | 1 | 2 | 3 | 4 | 5 | 6 | 7 |
|---|---|---|---|---|---|---|---|---|---|
| 2 | 3 | 4 | 5 | 6 | 7 | 8 | 9 | 10 | 11 | 12 | 13 | 14 |
| 9 | 10 | 11 | 12 | 13 | 14 | 15 | 16 | 17 | 18 | 19 | 20 | 21 |
| 16 | 17 | 18 | 19 | 20 | 21 | 22 | 23 | 24 | 25 | 26 | 27 | 28 |
| 23 | 24 | 25 | 26 | 27 | 28 | | | | |

Fig. 12.

Inventor
ELBRIGE GATEWOOD
by his attorneys
Howson and Howson

Jan. 4, 1944. E. GATEWOOD 2,338,377
PERPETUAL CALENDAR
Filed June 6, 1939 6 Sheets-Sheet 3

Jan. 4, 1944.   E. GATEWOOD   2,338,377
PERPETUAL CALENDAR
Filed June 6, 1939   6 Sheets-Sheet 4

Inventor
ELBRIGE GATEWOOD
by his attorneys
Howson and Howson

Jan. 4, 1944.   E. GATEWOOD   2,338,377
PERPETUAL CALENDAR
Filed June 6, 1939   6 Sheets-Sheet 6

Fig.33.

| 1900 | | 1800 | | BEGIN 1753 1700 | | 2000 LEAP YEAR 2000 |

| 00 | 10 | 02 | 03 | 09 | 04 | 05 |
|----|----|----|----|----|----|----|
| 06 | 07 | 13 | 08 | 15 | 10 | 11 |
| 17 | 12 | 19 | 14 | 20 | 21 | 16 |
| 23 | 18 | 24 | 25 | 26 | 27 | 22 |
| 28 | 29 | 30 | 31 | 37 | 32 | 33 |
| 34 | 35 | 41 | 36 | 43 | 38 | 39 |
| 45 | 40 | 47 | 42 | 48 | 49 | 44 |
| 51 | 46 | 52 | 53 | 54 | 55 | 50 |
| 56 | 57 | 58 | 59 | 65 | 60 | 61 |
| 62 | 63 | 69 | 64 | 71 | 66 | 67 |
| 73 | 68 | 75 | 70 | 76 | 77 | 72 |
| 79 | 74 | 80 | 81 | 82 | 83 | 78 |
| 84 | 85 | 86 | 87 | 93 | 88 | 89 |
| 90 | 91 | 97 | 92 | 99 | 94 | 95 |
|    | 96 |    | 98 |    |    |    |

| OCT | MAY | LP. YR. ONLY FEB | NOT LP. YR. FEB | JUN | SEP | APR |
|-----|-----|------|------|-----|-----|-----|
|     |     | AUG | NOV | | DEC | LP. YR. ONLY |
|     |     |     | MAR | | | JAN |
| NOT LP. YR. JAN | MAY | AUG | MAR | | DEC | JUL |

| SUN | SAT | FRI | THU | WED | TUE | MON |

| 7 | 6 | 5 | 4 | 3 | 2 | 1 |
|---|---|---|---|---|---|---|
| 14 | 13 | 12 | 11 | 10 | 9 | 8 |
| 21 | 20 | 19 | 18 | 17 | 16 | 15 |
| 28 | 27 | 26 | 25 | 24 | 23 | 22 |
|   |   |   |   |   |   | 29 |
|   |   |   |   |   | 30 |   |
|   |   |   |   | 31 |   |   |

131

*Inventor*
ELBRIGE GATEWOOD
*by his attorneys*
Howson and Howson

Patented Jan. 4, 1944

2,338,377

UNITED STATES PATENT OFFICE 2,338,377

PERPETUAL CALENDAR

Elbrige Gatewood, New York, N. Y.

Application June 6, 1939, Serial No. 277,659

18 Claims. (Cl. 40—111)

My invention relates to a multiple calendar, commonly known as a perpetual calendar. Numerous perpetual calendars have been patented. None of them known to the writer are acceptable to the general public for regular use as a calendar.

The calendar described in this specification eliminates the defects that have limited the usefulness of such calendars. The calendar described in this specification may be made in three different forms, rectangular or conventional, cylindrical, or disk or watch form. In the rectangular form the elements of the calendar, centuries, years, and months are placed on separate endless ribbons or cylindrical rings, and the days of the month are on a flat rectangular piece of metal or other rigid substance, which moves back and forth. In the disk form the rings are disk rings, and in the cylindrical form the rings are cylindrical.

In each case the movable parts are rotated or moved by a key so designed that it moves two parts in unison, of which one contains either the days of the month or the days of the week. All other parts are locked or held from movement, and the key is, itself, locked from turning except when it is locked with two, and not more or less than two parts.

The moving parts containing the elements of the calendar move behind a window, and the elements are so spaced on the rings, and on the rectangular days of the month piece, that a correct calendar is automatically shown at all times regardless of the skill or lack of skill of the operator. Moreover the month always shows the correct number of days. All years or months not desired are or may be hidden from view, thereby simplifying the calendar and giving it the normal appearance to which the public is accustomed.

The preferred form of calendar is the rectangular, or conventional shown in Figures 1 to 21.

Fig. 16 is a full length enlarged view showing the arrangement of the years of a century on the endless year ribbon;

Fig. 17 is a front view of the day tabulation plate;

Figure 21:
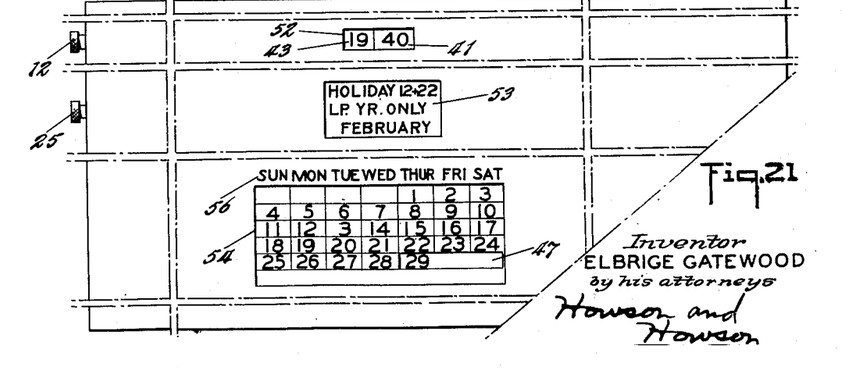
Fig. 21 is a broken face view of the calendar of Figs. 1 to 20.
Figure 22:
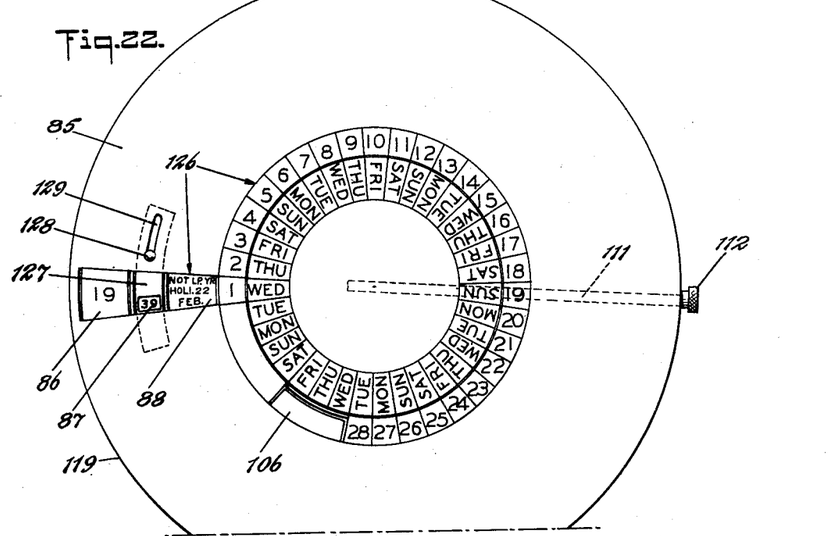
Fig. 22 is a face view of a calendar of modified construction.

In the preferred embodiment of the invention, the casing 1 as shown in Figure 21 has windows through which indicia for the year, month and tabulation of days are respectively displayed.

The tabulation of days is carried by a plate 45 on which, as shown in Figure 17, the days are arranged in numerical order, horizontally and in progression of seven vertically, the thirteen columns permitting the tabulation displayed to begin on any day of the week. This tabulation provides for the days of the month, of which seven columns show through window 54 in the front cover of the calendar. Through openings 46 and 47 of piece 45 can be seen numbers of days 30, 31 from table 51 on piece 48, and days 29, 30, 31 from table 55 of the same piece. 45 moves back and forth in guides 34 and 35, and is propelled by journaled gear 31 connected to another gear which meshes with teeth on the back of 45.

Figures 12, 13, 14, 15, 18, 19, 20:
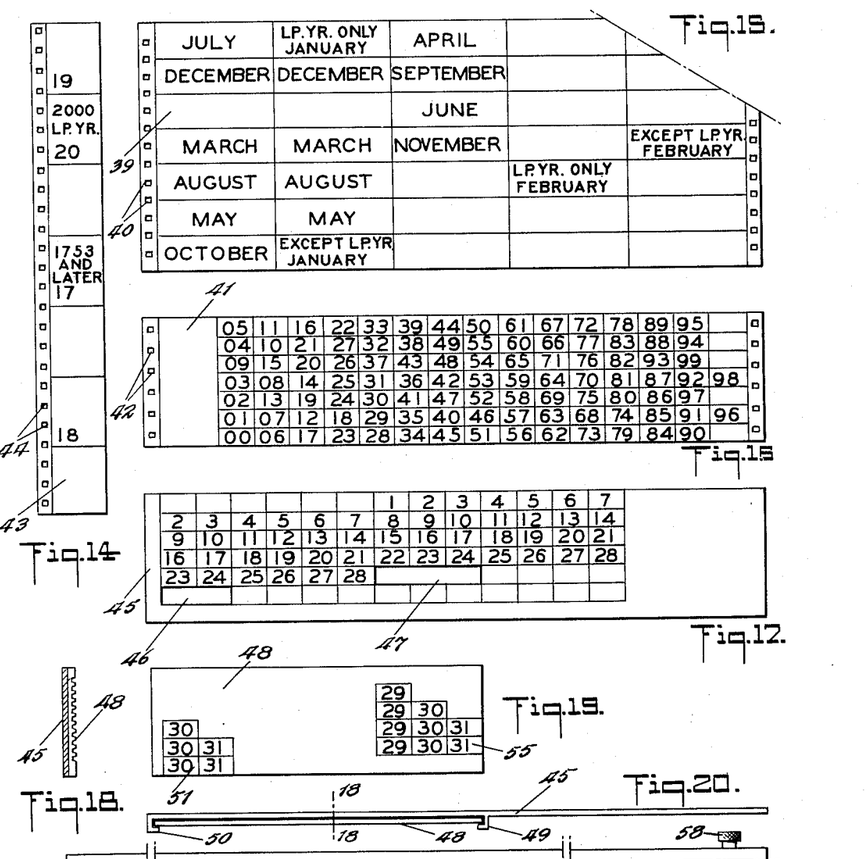
Fig. 14 is a full length enlarged view of an endless ribbon containing the centuries.
Fig. 15 is a full length enlarged view of an endless ribbon, containing the names of the months.
Fig. 18 is a sectional view taken as on line 18—18 of Fig. 20 through the day tabulation plate and the extra day plate.
Fig. 19 is a front view of the extra day plate.
Fig. 20 is an inverted view of the day tabulation plate and extra day plate as assembled.

The extra day plate shown in Figure 19 is vertically slidably mounted in vertical guides 49 and 50 on the back of the day plate 45 as shown in Figures 17, 18 and 20. It supplies the additional days required for months containing more than twenty eight days. Wide teeth on the back of 48 mesh with gear 28 shown in Figure 1, permitting it to be raised and lowered while at the same time travelling to right and left with 45.

Figures 2, 3, 4, 5, 6, 7, 8, 9, 10, 11, 12, 13:
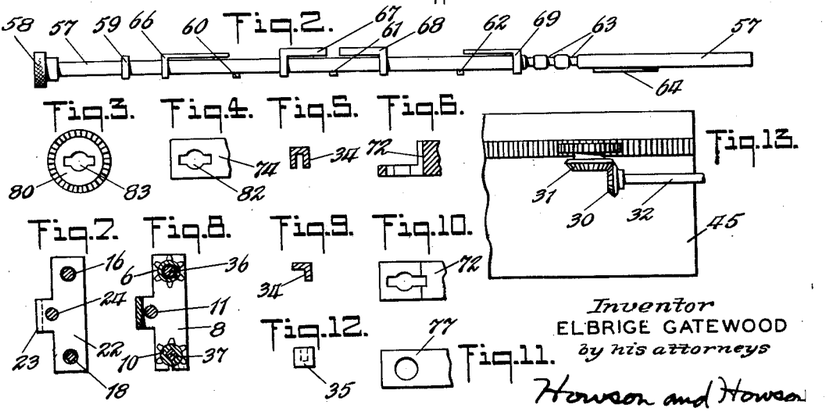
Fig. 2 is a view in elevation of the key shaft and locks by which the calendar is set and locked.
Fig. 3 is a plan view of one of the gears through which the key shaft passes and which is arranged to be locked to the key shaft by a projection on the key shaft.
Fig. 4 is a plan view of one of the parts which hold the gears in position showing the opening through which the key shaft passes and by means of which the key shaft is locked against turning in its passage from one position to another.
Fig. 5 is a sectional view taken as on line 5—5 of Fig. 1.
Fig. 6 is a central sectional view of a key way member.
Figs. 7, 8 and 9 are sectional views taken as on lines 7—7, 8—8 and 9—9, respectively, of Fig. 1.
Fig. 10 is a plan view of the key way member of Fig. 6.
Fig. 11 is a plan view of one of the two parts that hold in position the gear which operates the days part.
Fig. 12 is an end view of the bottom support for the days part, looking from the left in Fig. 1.
Fig. 13 is a view showing the manner in which the operating means engages the days part, the parts having been turned with respect to the operating shaft.

Figure 5 shows the shape of guide 34 at its right hand end, where it holds 45 in position. Figure 9 shows the guide above 48 with its inner part not extending beyond the top of 45. This permits 48 to move up and down. Guide 35 is of similar shape. Gear 28, pressing against 48 holds it in position.

The gear 28 is on a shaft 29 driven by bevel gearing 26 and 27 from shaft 24 which projects outside the casing 1 and carries an operating knob 25.

Figure 1:
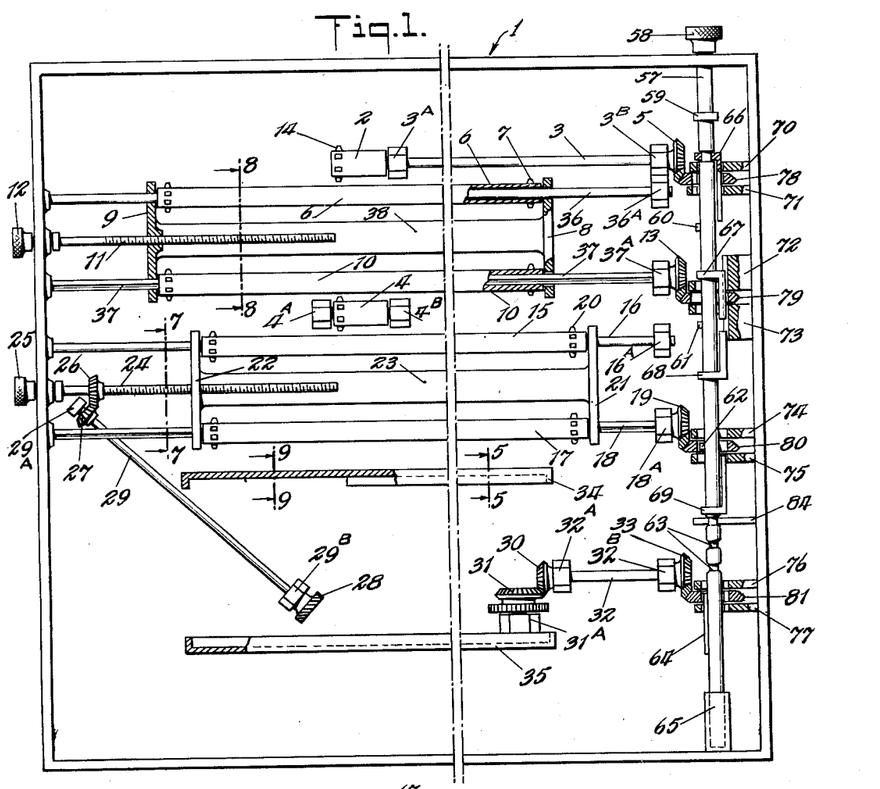
Fig. 1 is a front view of the mechanism of a calendar in accordance with the invention, the front of the calendar, the ribbons and date blocks being removed and some parts being shown in section.

The names of the months are borne by an endless belt 39 shown in Figure 15, the months having the same number of days being placed in the same vertical column, the columns being in the order of the number of days. The belt 39 passes over rollers 15 and 17 as shown in Figure 1, which are longitudinally slidable on shafts 16 and 18, being located thereon by guides 21 and 22 joined by a brace 23. A screw on the shaft 24 is threaded in an aperture in the guide 22.

The shaft 18 is driven by a gear 19 which meshes with a bevel gear 80 mounted on the actuator shaft 57 between guides 74 and 75. The gear 80 has an opening 83 with two key ways as shown in Fig. 3, and the guides 74 and 75 have similar openings 82 as shown in Fig. 4. These openings receive projection 62 and key lock 69.

The day plate operating gear 31 is driven by bevel gearing 30 from shaft 32 carrying a gear 33 meshing with bevel gear 81 mounted on the shaft of actuator 57 between guides 76 and 77. The guides have openings as in Figure 11 which allow projection 64 to enter the openings and rotate freely. Gear 81 is at all times meshed with the shaft by means of the projection 64 on the shaft.

The display of the year is provided by the combination of a year ribbon 41 and a century ribbon 43. On the year ribbon 41 shown in Fig. 16 the years progress from left to right, but at times, as in the case of the year 12, a smaller number may be in a column further than a larger number 13 and 15. This ribbon is an endless belt which passes over rollers 6 and 10 shown in Figure 1, longitudinally slidably mounted on shafts 36 and 37, and located by a guide comprising ends 8 and 9 connected by a brace 38. A screw 11 threaded in the end 9 has an operating knob 12 outside the casing 1.

The roller 10 is driven by the shaft 37 which carries a gear 13 which meshes with a gear 79 mounted on the actuator shaft 57 between guides 72 and 73. The gear 79 has openings with key ways like those shown in Fig. 3, to receive the projection 61, and the guides 72 and 73 have elongated openings as shown in Figs. 6 and 10, to receive the keylocks 67 and 68.

On the century ribbon 43 shown in Figure 14, the centuries are arranged in an order determined by the days of the week on which the months after February begin in the years of the different centuries. This ribbon is an endless belt which passes over rollers 2 and 4 shown in Figure 1. The roller 2 is driven by a shaft 3 carrying a gear 5, which meshes with a bevel gear 78 mounted on the actuator shaft 57 between guides 70 and 71. The gear and the guides have openings provided with two key ways similar to those shown in Figures 3 and 4 to receive the projection 60 and the keylock 66.

It will thus be seen that the display parts always operate in pairs, one member of the pair being at all times the day tabulation plate 45, shown in the Figure 17, and the other member of the pair being selected by raising or lowering the shaft 57 by means of the knob 58 which extends outside of the case 1. The order in which the centuries, years and months are arranged on their respective ribbons is such that any movement of any of them simultaneously with a movement of the day tabulation plate will result in placing the days of the month under the correct weekday names for the calendar period shown in the window.

The manner of operation of the rectangular or conventional form of this invention is as follows:

With key 57 in the position shown in Figure 1, projection 62 of the key is in mesh with gear 80 at one end of the opening 83 shown in Figure 3. When key 57 is turned in either direction by knob 58, gear 80 operates gear 19 on shaft 18, turning roller 17 and with it the endless ribbon 39 which contains the names of the months. At the same time gear 81, which is in mesh with the key through projection 64, turns gear 33 and, through shaft 32, and gears 30 and 31, moves the rectangular piece 45. The relative sizes of the gears are such that each one half revolution of key 57 moves ribbon 39 one space up or down and piece 45 one space back or forward.

While the month ribbon is being moved the other gears for the year and century ribbons are locked in position. Gear 78 which operates the century ribbon is locked by 66 which projects downward through gear 78. Gear 79 is locked by 67 which projects downward in a similar manner. Parts 66, 67, 68 and 69 are all journaled on the shaft of the key 57. They do not turn with the key because they are at all times held from turning by the right hand part of the opening 82 or a similar opening in 70, 71, 72, 73, 74 and 75. Parts 70 to 77 inclusive are all a part of the frame 1 and do not move. Parts 72 and 73 extend up and down with a groove which is a continuation of the opening similar to 82. This extension is necessary to keep 67 and 68 from turning with the key at the upward and downward ends of the key's travel. See figures, Numbers 6 and 10.

After the month ribbon has been moved until the name of the month desired is in line horizontally with the window 53, threaded shaft 24 is turned in either direction by means of knob 25. This moves the month ribbon to right or left by sliding the ribbon carrier along the circular shaft 16 and the irregularly shaped shaft 18. Shaft 16 and shaft 18 are journaled. Shaft 18 is of irregular shape to match a similar irregularity in roller 17, thus enabling the shaft to turn the roller.

Assume that we want the month of February, not a leap year, and that the carrier of the month ribbon is at its extreme position to the right. In this case the month of March would show in the window, and the days 29, 30, and 31 at the bottom of 48 would show through opening 47, and the days 30 and 31 through the opening 46 of part 45. (So much of them as was visible through window 54.)

When shaft 24 turns, gear 26 on the shaft in mesh with gear 27 on journaled shaft 29 moves 48 upward by means of gear 28 in mesh with teeth on the back of 48. The threads on 24 and the gears 26, 27, and 28 are so proportioned that as the threads of 24 draw the carrier of the month ribbon back one space, 48 is lowered one space. Thus when the month in either of the two first columns of the month ribbon is before the window, the month shows 31 days through window 54. When a thirty day month shows in the window, only 30 days are shown, and similarly the leap year month of February shows 29 days, and the February other than a leap year shows only 28 days. In practice the month ribbon would usually be moved horizontally until the month of the length desired was vertically in line with the window, then the ribbon would be turned up or down by means of key 57.

To change the year, key 57 is pulled up one space. To make it easy to measure the distance a piece of flexible metal 84 projects outward from the frame against the key shaft. A depression 63 receives 84 when the key has been pulled the proper distance. This will be felt by the fingers holding knob 58. As the key shaft moves upward, it is held from turning by 62 which has emerged from the end of the opening 83 in gear 80 and has entered the similar opening in 74. Also 61 is similarly locked in 73. When 61 has entered into mesh with gear 75, 79, 62 will have emerged from 74 and the key will be free to turn. Before 62 entirely left gear 80, the end of 69 will have entered and locked the gear from turning. Gear 81 is at all times in mesh with the key by means of projection 64, and is never locked but always turns when the key turns. See Figure 11 for the shape of 76 and 77. Gear 78 which operates the century ribbon remains locked by 66.

Before turning the year ribbon by key 57, move the year ribbon horizontally by turning threaded shaft 11 by means of knob 12, until approximately the column desired is reached. It will be observed that the years progress from left to right on the ribbon, but that at times, as in the case of year 12 a small number may be in a column further than a larger number year 13, and 15. Ribbon 41 is now turned either up or down until the desired year appears in the window 52. If it does not appear, the ribbon is shifted one space by means of 12, and 57 is turned again. The action may be facilitated by printing on the back of the calender the years as they appear on ribbon 41. This may then be used as a reference. However it should not be necessary since the year is seldom changed. Since the century ribbon 43 is in front of the year ribbon the two ribbons together give the full century, the first two digits being supplied by the century ribbon, and the last two by the year ribbon.

To change the century, key 57 is pulled up until stop 59 reaches the limit of its travel and is stopped by the top of the case 1. In this movement the year gear 79 becomes locked by 68 while the month gear 80 remains locked by 69. Also during the changing of position of the key it is kept from turning by 61 in an opening in 72 similar to the opening 82 shown in Figure 4. Knob 58 is then turned in either direction until the desired century appears in window 52.

It will be observed that the key 57 can never turn except when it is meshed with two of the gears, that gear 81 and only one other gear will be in mesh with the key at any one time, and that the figures and names on the various portions of the calendar are all so placed that any date shown in the windows will always have the correct length of month and that the days of the month will always be under the proper week day names. The week day names 56 are printed on the front of the case 1. Since 45 can travel only six spaces before it reaches the limit of its travel and is stopped by end pieces on the guides 34 and 35, the ribbons may be stopped from turning in one direction. When that happens, it is only necessary to reverse the direction. It will always be possible to get any name or number on any ribbon by turning in one direction or the other.

While the drawings show only one century ribbon, it is possible to add other ribbons properly spaced and carried on an arrangement similar to the years and months whereby the ribbons may be shifted horizontally. Such an arrangement will permit extension of the calendar into the earlier centuries as far as may be desired. The century ribbon moves faster than the year ribbon because it is on rollers of greater diameter. In all cases key 57 is moved a half turn, or multiples of half a turn. The key cannot be shifted at any other point, as in only two places can it pass through the opening 82 and similar openings. Suitable bearings 3A, 3B, 4A, 4B, 16A, 16B, 18A, 29A, 29B, 31A, 32A, 32B, 36A and 37A are provided for the various rotatable shafts as shown in Fig. 1.

Figures 23, 24, 25:
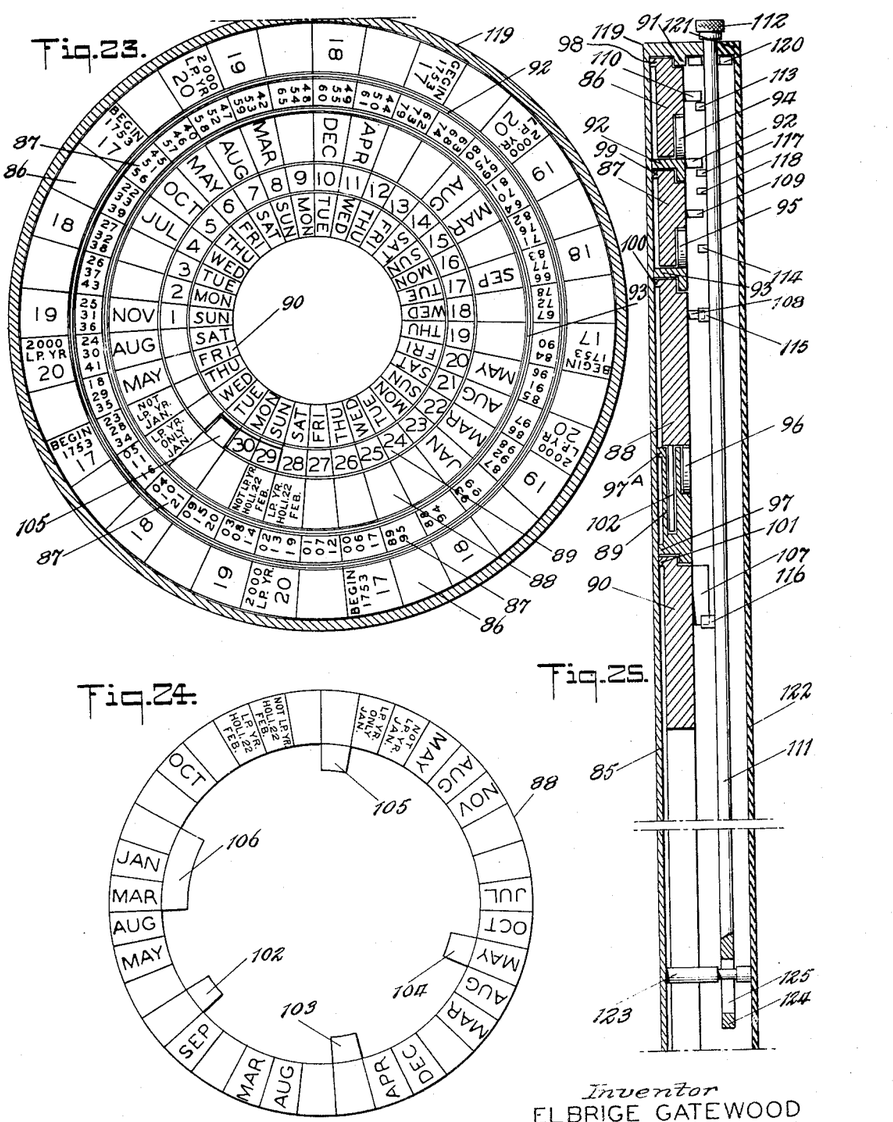
Fig. 23 is a plan view of the calendar of Fig. 22 with the top cover cut away to reveal the arrangement of the centuries, years, months, days of the month, and days of the week on the respective elements of the calendar.
Fig. 24 is a plan view of the month disk shown detached from the calendar to show the projections for covering the 29th, 30th and 31st days of the days of the month ring.
Fig. 25 is an enlarged radial sectional view showing the relation of the operating key to the various elements of the calendar of Figs. 22 and 23.
Figure 26:
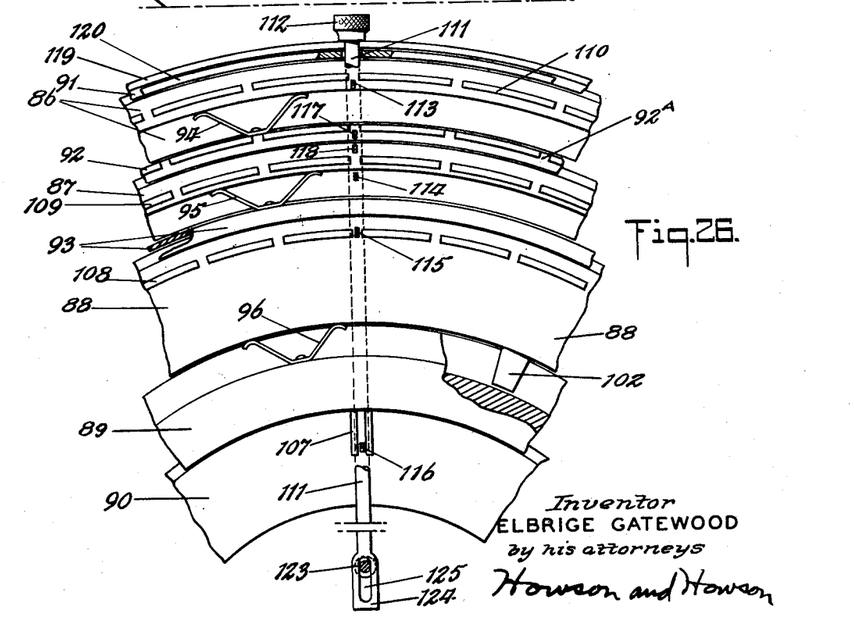
Fig. 26 is an enlarged fragmentary view showing the bottoms of the various elements of the calendar and indicating the operative relation of the operating key thereto.

Another form of calendar under this invention is in the shape of a disk or watch, as shown in Figures 22 to 26. The complete calendar comprises four revolving rings 86, 87, 88 and 90, bearing on their front respectively centuries, decades and years, months, and days of the week, each in thirty-five spaces, and stationary ring 89 which are shown in Fig. 23 in the relative positions they will occupy when placed in the frame 85. Rotating ring 86 is supported by 91, which is a part of or attached to case 85. Rotating rings 87 and 88 are supported by 92 and 93 which are attached to the inner part of the front of case 85. Rotating ring 90 is supported by a projection of stationary ring 89 which is fastened to the front of case 85.

The month ring 88 has inner extensions 102, 103, 104, 105, and 106 which pass in front of the days 29, 30 and 31 to cover one or more of these days which are placed on a low part of the stationary ring 89. The projections 102 to 106 pass below the other days as they are placed on a higher portion of the stationary ring 89 which is broken away over 29, 30 and 31. This construction is shown in Fig. 25 where the extension 102 of the ring 88 is shown passing between spaced high and low portions of the fixed ring 89. The part of ring 89 towards the top of casing 85 carries the days 1 to 28 while the part towards the bottom of the casing carries the days 29, 30 and 31. The inner projections are so spaced on the month ring 88 in relation to the month names on that ring that, when any month containing 31 days is under the window 126, none of the figures are obscured. When a 30 day month is visible in the window, the day 31 is hidden by one of the extensions. Similarly the days 30 and 29 are hidden as required to give each month its proper number of days.

The various rings are selectively operated by the key 111, and are provided with springs which hold the rings from turning. Three springs are used for each of the rings 86, 87, and 88. The springs 94 are secured at spaced points on 92 to bear frictionally on ring 86, springs 95 are secured to 93 and bear on ring 87 while springs 96 are secured to ring 89 and bear on ring 88. These rings 94, 95, and 96 are all stationary, and press against the rings with sufficient force to act as brakes preventing any movement of the rings due to shaking or jarring the calendar, but not to prevent the turning of the rings by the key 111.

The shaft key 111 is fastened to the center post 123 which passes through opening 125 in the end 124 of key shaft 111 in such manner that the key can be pulled out as far as is necessary to lock with the different rings as required. The top 85 and the bottom 122 of the calendar are fastened rigidly to the center post. The key 111 is provided with projections 113, 114, 115 and 116 which engage with projections on the rings 86, 87, 88 and 90, respectively, to rotate the rings and is also provided with projections 117 and 118 which engage with projections on the locking ring 92.

The locking ring 92 locks the key from turning except when it is properly locked with ring 86, 87 or 88.

The corners of 113, 114 and 115 should be rounded or these parts should be made octagonal in shape to insure that they will enter between projections of rings.

The under surfaces of the rotatable rings, except ring 90, carry a downward extension with thirty-five slots equally spaced by which extensions on the key mesh the key with the rings.

The manner of operation of this form of the calendar is as follows:

With key 111 in the position shown in Figure 25, ring 88 is locked with the key by extension 115 of the key. 115 is in one of the thirty-five slots of the extension 108 of the ring 88. See Figure 26. The key is pulled in either direction with the fingers of one hand while the calendar is held in the other hand. The upper portion 85 of the case, and the lower portion 122 are rigidly fastened to the center post 123, and at no other point. They are separated all around the edge to permit the key 111 to revolve around 123. The opening around the edges is closed by ring 120. This ring 120 fits snugly against the inner face of the edge 119 of the case, keeping out dust and other particles. It has one opening, through which the shaft of the key comes. When the key is pulled in either direction the ring 120 slides around with it. The inner ring 90 containing the days of the week is at all times locked with the key by the key extension 116 and the two extensions 107 of the ring 90. As the key is pulled around, the week days change their position relative to the stationary days of the month. The month names are so spaced on ring 88 that, when any month on the ring comes under the window 126 the week days will be in the correct position to give a true reading for the month, year, and century shown in the window 126. This window comprises a circular portion revealing all of the days of the week and of the month and a radial extension, shown at the left in Fig. 22, revealing only one century, year, and month.

To change the year the key is pulled out as far as it will go. While it is being pulled out it cannot be rotated because projection 117 is in one of thirty-five slot-like openings in the stationary ring guard 92. After 117 comes out of this slot, the key can be rotated, and at this time it is keyed with the century ring by extension 113 of the key in one of the thirty-five slots of extension 110 of the century ring. Then, as the key is pulled further out, extension 118 on the key 111 enters the slot-like opening 92A and remains until the key is pulled out to its limit, at which time the year ring 87 is locked by means of extension 114 of the key in one of the thirty-five slots of extension 109 of the year ring. The object of extensions 117 and 118 and the slot-like openings 92A is to insure that the key shall at no time be rotated without rotating one and only one of the rings 86, 87, or 88, since such rotation would place the week day names in an incorrect position. The year ring being now locked with the key, the key is turned in either direction until the desired year shows in the window 126. Window 126 permits one century, two or three years and decades, one month, and all of the days to be seen. The year ring shows either two or three years in each space on the ring. The calendar is correct for any year shown in one space. But, for the sake of clarity and appearance, a shield 127 with an opening sufficient to show only one year is used. This shield is operated by the thumb nail projection 128 protruding through the slot 129 of the case 85. This shield is moved until the desired year is shown and the other one or two years are hidden. All years are so spaced that they will appear in the window at a time when the correct week day names are before the days of the month.

In a similar manner the century is changed. The spacing of the centuries is also such as to keep the week days in the correct position for any century, year and month shown. It will be observed that any year from 1753 to 2099 may be shown on the calendar. Leap years will be in red as a warning to the user. The note "2000 leap year" on the century ring will also be in red as a warning that the year 2000 is a leap year. The setting of the calendar is the same for leap years except that the months January and February must be set so that the ones with the note "leap year only" will be shown in the window. This note is also in red.

Projections 98, 99, 100 and 101 are in contact with the case face 85 as the rings revolve. They prevent that part of the ring on which the numbers are printed being worn by scraping against the case front. 97 and 97A are used to fasten stationary ring 89 to the case front. It will be observed that the rotating rings are supported from below by 91, 92, 93, and 89.

A third form of the invention, cylindrical in shape, is illustrated in Figures 27 to 37, inclusive. This form of the invention comprises a suitable cylindrical casing 180A having an opening or window 181 extending substantially the full length of the casing. The casing is closed at one end by a bottom preferably formed integral with the casing and at the other end by a suitable closure 180 having an annular extension or flange 157. In the casing is a key shaft 178 having its inner end slidably supported in a suitable bearing 130 fixed to the bottom of the casing and its other end slidably supported in an opening in the top 180. Upon the key shaft 178 are fixed a gear 158 having a wide face and gears 136, 137, 138 and 139 having narrower gear faces. All these gears are of the same number and size of teeth and are arranged with their teeth in alinement. Also mounted on the shaft 178, but not fixed thereon so as to rotate therewith, are locks 140, 141, 142, 143, 144 and 145 having flat alined upper ends of various widths and which are held against rotation by having their lower ends engaged in a trough or channel-shaped member 130A, which extends substantially throughout the casing and at its inner end has an angularly extending portion serving to support the trough 130A from the bearing 130. Collars 146 and 147, secured to the shaft 178, serve to prevent movement of the gears and locks longitudinally of the shaft.

Inside case 180A and extending from the bottom of the casing 157 of the top 180 are rotatable rings 131, 132, 133, 134 and 135 having marked on their outer circumferences the days of month, week day names, months, years and decades, and centuries, respectively, in seven spaces. On their inner circumferences these rings are formed with internal gears 131A, 149, 150, 151, and 152, respectively, adapted to be meshed with gears 158, 136, 137, 138 and 139, respectively, or to be engaged with locks 140, 141, 142, 143, 144 and 145.

Figures 29, 30, 31, 32:
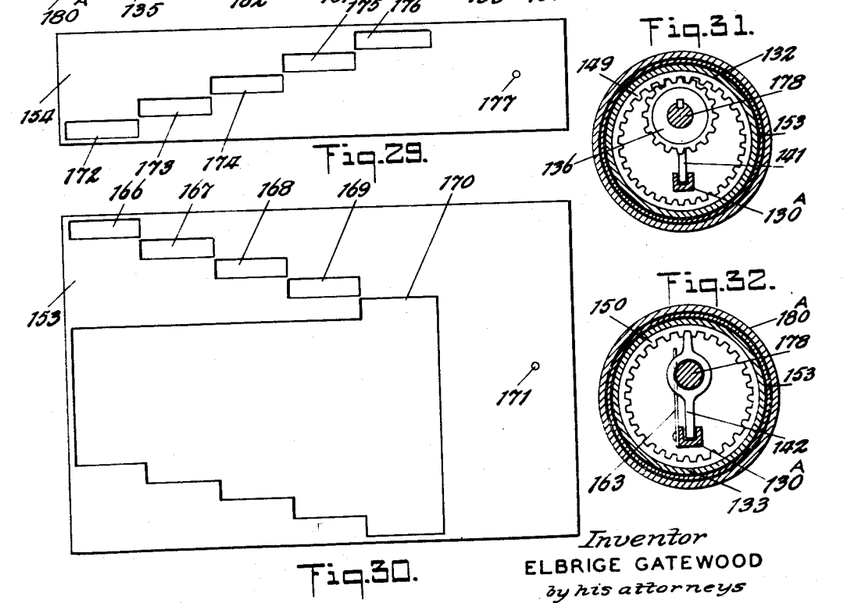
Figs. 29 and 30 are developments of window rings of Fig. 27.
Figs. 31 and 32 are sectional views taken as on lines 31—31 and 32—32, respectively, of Fig. 27.
Figure 33:
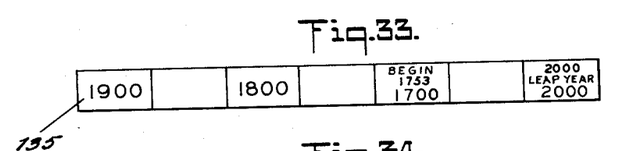
Figs. 33, 34, 35, 36 and 37 are developments of the rings of the calendar of Figs. 27 and 28 showing the arrangements of the centuries, years of a century, months, days of a week and days of a month, respectively, on the respective rings of the calendar of Figs. 27 and 28.
Figure 34:
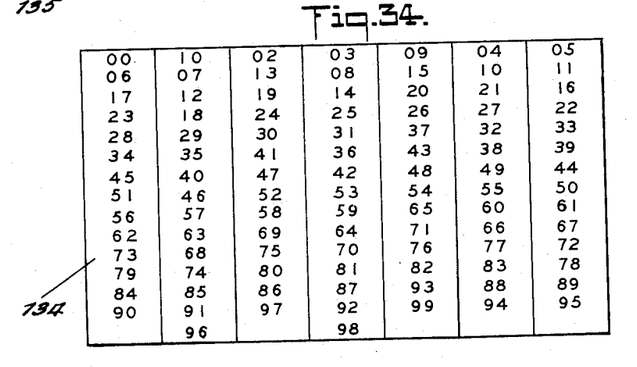
Figure 35:
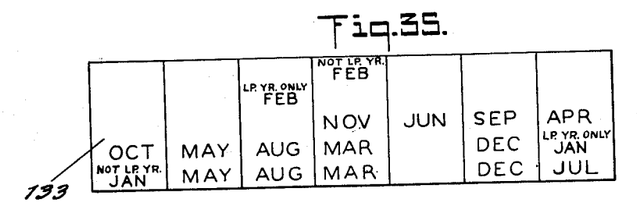
Figures 36, 37:
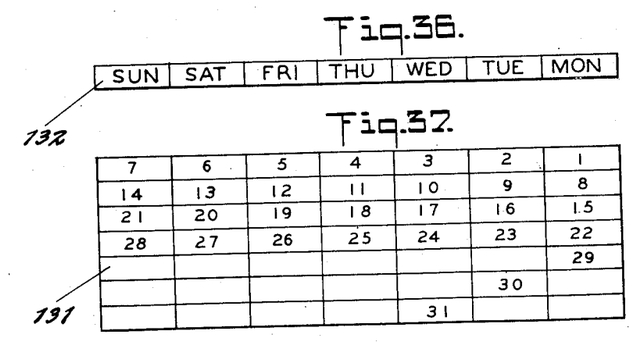

Between the rotatable rings 131 to 134 and the inner circumference of the casing 180A are four rings 153, 154, 155 and 156 made of thin metal. These rings are placed end to end and extend from the bottom of the casing 180A to the ring 135. These rings and the calendar rings 131 to 135 are rotatable independently of each other. These rings are provided with openings to permit the markings on rings 131 to 134 to be seen through the window 181; thus the ring 153, shown in Fig. 30 is provided with the large irregular shaped opening 170 and the smaller rectangular openings 166, 167, 168 and 169 arranged as shown. The other rings 154, 155 and 156 are provided with the rectangular openings 172, 173, 174, 175, and 176 arranged as shown in the development of ring 154 illustrated in Fig. 29. Projections, as the projections 171 and 177 of Figs. 30 and 29, respectively, are provided for operating these rings, such projections extending through slots, as slots 159, 160, 161, and 162, in the casing 180A for engagement by the operator.

The openings 166, 167, 168, 169 and 170 permit only one month to be viewed through the window 181. The large opening 170 also permits the week days to be seen and as many days of the month as are contained in the month which is visible. It will be noted that when the month is seen through the opening 170 or through opening 169, the ring 131 is visible from top to bottom. When the opening 168 is before window 181, the bottom of ring 131 with the thirty-first day is hidden and the month shown has only thirty days. Through the opening 167 the leap year month of February can be seen and the opening 170 then shows twenty-nine days. Through the opening 166 an ordinary February can be seen and the opening 170 then shows twenty-eight days.

The three similar rings 154, 155 and 156 cooperate in concealing all the years except the one it is desired to display. Two of the rings are turned so as to conceal the five years beneath each of them while the third ring is turned so that the desired year is displayed.

Figure 27:
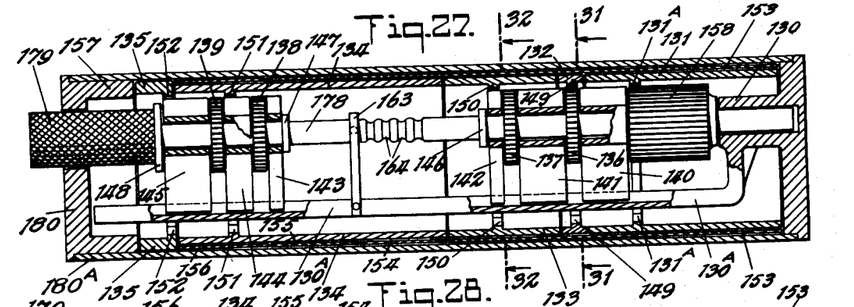
Fig. 27 is a longitudinal sectional view of a further modification of a calendar in accordance with this invention, the calendar being shown as of cylindrical shape.
Figure 28:
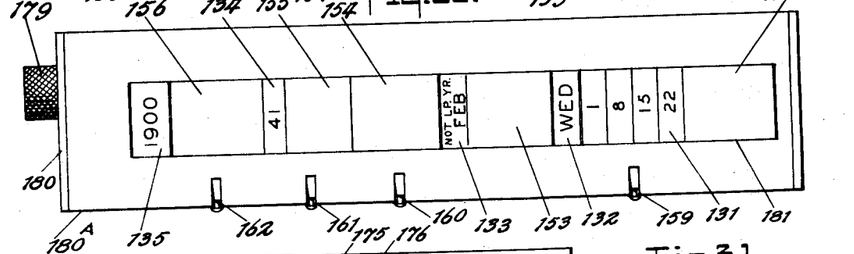
Fig. 28 is a view showing the face of the complete calendar.

When the shaft 178 is positioned as shown in Fig. 27, the spring detent 163 is engaged in the first of the grooves 164 in the shaft 178, the gears 158 and 136 are engaged with gear 131A on ring 131 and gear 149 on ring 132 while locks 142, 144 and 145 are engaged with gear 150 on ring 133, gear 151 on ring 134 and gear 152 on ring 135, respectively. If the shaft 178 be rotated in either direction while in this position, ring 131 will be rotated by gear 158 and ring 132 will be rotated by gear 136 while rings 133, 134 and 135 will be held stationary by the locks engaged therewith thus giving a simultaneous movement of the week day ring, and the days of the month ring only. When it is desired to change the month shown, the shaft 178 is pulled out by means of the knob 179 until the spring detent 163 engages in the next or second groove 164 in the shaft 178. As the shaft 178 is pulled out all the gears and locks are moved therewith. During this movement the gear 158 remains in engagement with the gear 131A on ring 131, gear 136 moves from engagement with gear 149 on ring 132 and lock 140 engages with the gear 149. Lock 142 moves from engagement with gear 150 on ring 133 and gear 137 engages with the gear 150. Locks 144 and 145 remain in engagement with the gears 151 and 152, respectively. Rotation of the shaft 178 while in this position thus causes simultaneous movement of the month ring and the days of the month ring while the remaining rings are held stationary.

During the longitudinal movement of the shaft 178 the gear 136 and lock 140 are both engaged with the gear 149 for a time and lock 142 and gear 137 are both engaged with gear 150 for a time so that until the longitudinal movement of the shaft 178 is completed rotation of the shaft is prevented. To shift the year ring, the shaft 178 is pulled out until the spring detent engages in the next or third groove 164. During this movement of the shaft 178, the gear 158 remains engaged with the gear 131A of ring 131, lock 140 remains engaged with gear 149, gear 137 is moved from engagement with gear 150 of ring 133 and lock 141 engaged therewith, both gear 137 and lock 141 being engaged with gear 150 during the movement and holding the shaft 178 against rotation. Lock 144 is moved from engagement with the gear 151 and gear 138 engaged therewith, both being engaged until the movement is completed. Lock 145 remains engaged with gear 152 of ring 135. In this position of shaft 178 the year ring and the day of the month ring are moved simultaneously while the remaining calendar rings are held stationary.

To change the century shown, the shaft 178 is pulled out until the shoulder 148 on the shaft end 179 engages the top 180 of the casing. During this movement of the shaft 178, the gear 158 remains engaged with the gear 131A on ring 131, locks 140 and 141 remain engaged with gears 149 and 150, respectively, gear 138 is moved from engagement with gear 151 on ring 134 and lock 143 engaged with the gear 151, both being engaged until the movement is completed and holding the shaft 178 against rotation, and lock 145 is moved from engagement with gear 152 on ring 135 and gear 139 engaged with gear 152, both being engaged with gear 152 until the movement is completed. In the position of the shaft 178 the century ring and the days of month ring are operated simultaneously while the remaining rings are held stationary. It will be noted the gear 158 is of such width that it remains continuously in engagement with the gear 131A on ring 131.

As in the other forms of the calendar, the calendar elements on the various rings are arranged in such order that a shift of a ring by one space in unison with a shift of the days of the month ring for one space will at all times result in a correct calendar.

The calendar shown can be made as small as a fountain pen or smaller. It can also be made large by using multiples of seven spaces on the calendar element rings, repeating the numbers and names in the order given as many times as desired. The calendar so enlarged can encircle a container which may be used as a pin tray, ash receiver, flower vase or for any other objects desired.

I claim:

1. In a calendar, a plurality of movably mounted, separately operable members carrying different elements of the calendar, means for movably mounting said members, a key member, means mounting said key member for rotating and longitudinal movements, selective interengaging means for operatively connecting said key member and individual element carrying members upon longitudinal movement of said key member, an additional movably mounted calendar element carrying member, means movably mounting said additional member, means operatively connecting said additional member to said key member for operation by said key member upon rotation of said key member to operate any one of said separately operable members.

2. In a calendar, movably mounted, separately operable members carrying different elements of the calendar, means for movably mounting said members, a key member, means mounting said key member for rotating and longitudinal movements, means for operatively connecting said key member and individual separately operable members, said key member being longitudinally movable from a position for connection with one of said separately operable members to a position for connection with another of said separately operable members, an additional element carrying member, means rotatably mounting said additional member and means operatively connecting said additional member to said key member, said additional member being operated by rotation of said key member simultaneously with the operation of any of said separately operable members by said key member.

3. In a calendar, movably mounted, separately operable members carrying different elements of the calendar, means movably mounting said members, a key member, means mounting said key member for rotating and longitudinal movements, means for operatively connecting said key member and individual separately operable members, said key member being shifted longitudinally for disconnecting from one and connecting to another of said separately operable members, an additional element carrying member, means rotatably mounting said additional member, means operatively connecting said additional member to said key member, said additional member being operated by said key member upon rotation of said key member to operate any one of said separately operable members and means preventing movement of said separately operable member when not connected to said key member.

4. In a calendar, movably mounted, separately operable members carrying different elements of the calendar, means movably mounting said members, a key member, means mounting said key member for rotating and longitudinal movements, means for connecting said key member and individual ones of said separately operable members for operation by rotation of said key member, said key member and said individual separately operable members being operatively connected with said key member in different positions longitudinally of said key member, an additional element carrying member, means movably mounting said additional member, means operatively connecting said additional member to said key member, said additional member being operated by said key member upon operation of any one of said separately operable members, and means preventing operation of said key member during movement from one operative position to another.

5. In a calendar, a plurality of rings having calendar elements thereon, means rotatably mounting said rings, each of said rings having an internal gear formed thereon, a key member, means mounting said key member for rotating and sliding movements, gears fixed on said key member and arranged for engagement with said internal gears, and locking means adapted to be engaged with said internal gears to prevent rotation of said rings.

6. In a calendar, a plurality of rings having calendar elements thereon, means for rotatably mounting said rings, each of said rings having an internal gear formed thereon, a key member, means mounting said key member for rotating and longitudinal movements, gears fixed on said key member and movable into and out of engagement with certain of said internal gears by longitudinal movements of said key member, an additional gear fixed on said key member and continuously engaged with one of said internal gears in all positions of said key member, and locking means operated by longitudinal movements of said key member and engaged with internal gears disengaged by gears on said key member.

7. In a calendar, a plurality of rings having calendar elements thereon, means for rotatably mounting said rings, each of said rings having an internal gear formed thereon, a key shaft, means mounting said key shaft for rotating and longitudinal movements, gears fixed on said key shaft and movable into and out of engagement with certain of said internal gears by longitudinal movements of said shaft, an additional gear fixed on said shaft and continuously engaged with one of said internal gears, said gears being arranged for operating two rings only in any operative position of said shaft, and locking means operated by said shaft to prevent rotation of the rings not operated by said gears.

8. In a calendar, a plurality of rings having calendar elements thereon, means for rotatably mounting said rings, each of said rings having an internal gear thereon, a key shaft, means mounting said key shaft for rotating and longitudinal movements, gears fixed on said key shaft and movable into and out of engagement with certain of said internal gears by longitudinal movements of said shaft, an additional gear fixed on said shaft and continuously engaged with one of said internal gears to operate a ring upon rotation of said shaft, said last mentioned ring being operated selectively with any other of said rings, and locking means operated by said shaft for preventing rotation of the rings not engaged with said gears, said locking means cooperating with said gears on said shaft in preventing rotation of said shaft during longitudinal movement thereof.

9. In a calendar, a cylindrical casing having a window therein, a plurality of rings in said casing having the months and days of the month thereon on separate rings, said month ring having the months arranged thereon in different lines in the order of the number of days in the month, said days of the month ring having the twenty-ninth, thirtieth asd thirty-first days on separate lines below the other days, means for rotatably mounting said rings, means for operating said rings, means mounting said operating means for rotating and sliding movements, a third ring, means for rotatably mounting said third ring between said month and days of the month rings and said casing, said third ring having openings for displaying a desired month and only the proper number of days for said displayed month, and means for operating said third ring independently of said other rings.

10. In a multiple year calendar, a cylindrical casing having a window therein, a plurality of rings in said casing having the centuries, decades and years, months, week-days and days of the month thereon, means for rotatably mounting said rings, means for selectively operating the days of the month ring with any of the others of said rings, means mounting said operating means for rotating and sliding movements, masking rings, means rotatably mounting said masking rings between said casing and the rings having the calendar elements thereon, said masking rings having openings for displaying the desired year, month, week day and only the proper number of days for the displayed month, and means for operating said masking rings independently of said calendar rings.

11. In a multiple year calendar, a plurality of concentric rings having calendar elements thereon, means rotatably mounting said rings, a key member, means mounting said key member for longitudinal and rotating movements, co-operating projections on said rings and key member whereby rotation of said key member rotates said rings, said key member being movable longitudinally for selectively engaging said rings, an additional rotatable ring, means rotatably mounting said additional ring and cooperating continuously engaged projections on said additional ring and key member whereby said additional ring is operated with each selected ring.

12. In a calendar, a plurality of concentric rings having calendar elements thereon, means rotatably mounting said rings, a key member, means mounting said key member for longitudinal and rotating movements, co-operating projections on said rings and key member whereby rotation of said key member rotates said rings, said key member being movable longitudinally for selectively engaging said rings, an additional rotatable ring, means rotatably mounting said additional ring, co-operating continuously engaged projections on said additional ring and key member whereby said additional ring is operated with each selected ring, a fixed locking ring and co-operating projections on said locking ring and key member whereby rotation of said key member is prevented unless engaged with a selectively operated ring.

13. In a multiple year calendar, a plurality of concentric rings having the centuries, decades and years, and months arranged thereon, means movably mounting said rings, a key member, means mounting said key member for rotating and longitudinal movements, co-operating projections on said rings and key member whereby rotation of said key member rotates said rings, said key member being longitudinally movable for selectively engaging said rings, an additional ring having the days of the week thereon, means rotatably mounting said additional ring, co-operating projections on said additional ring and key member whereby said additional ring rotates at all times with said key member, and a fixed ring having the days of the month thereon, said day of the week ring being operated with each of said selectively operated rings, whereby a calendar correct for the year and month displayed is continuously presented.

14. In a calendar, concentric rings having the months and the days of the week arranged thereon, means mounting said rings for rotating movements, a key member for operating said rings simultaneously, means mounting said key member for rotating and sliding movements, a fixed ring having the days of the month arranged thereon, the twenty-ninth, thirtieth and thirty-first days being arranged at a lower level than the remaining days and projections on said month ring for covering said days at the lower level to make the days displayed conform with the month displayed.

15. In a calendar, a plurality of endless carriers having calendar elements thereon, rolls over which said carriers pass, means movably mounting said rolls, a key member, means mounting said key member for rotating and longitudinal movements, means for selectively engaging said key member and rolls upon longitudinal movement of said key member for operation of said carriers upon rotation of said key member, and m... for shifting some of said carriers and rolls transversely.

16. In a multiple year calendar, a plurality of endless carriers having the centuries, decades and years and months thereon, rolls over which said carriers pass, means movably mounting said rolls, a key member, means mounting said key member for rotating and longitudinal movements, means for selectively engaging said key member and rolls upon longitudinal movement of said key member for operation of said carriers upon rotation of said key member, a flat carrier having a tabulation of days of the month thereon, means movably mounting said flat carrier and means connecting said flat carrier and said key member for shifting said flat carrier upon operation of any of said continuous carriers.

17. In a multiple year calendar, a plurality of endless carriers having the centuries, decades and years and months thereon, rolls over which said carriers pass, means movably mounting said rolls, a key member, means mounting said key member for rotating and longitudinal movements, means for selectively engaging said key member and rolls upon longitudinal movement of said key member for operation of said carriers upon rotation of said key member, and means for shifting said carrier with decades and years thereon laterally with respect to said century carriers.

18. In a calendar, a casing having an endless carrier thereon, means movably mounting said carrier, said carrier having the names of the months thereon in seven vertical spaces in such order that each vertical space represents a difference of one day in the week with which the month begins in any given year and with the months spaced horizontally in five spaces of which two spaces at one side will contain months with thirty-one days and the other spaces will respectively contain months with thirty, twenty-nine and twenty-eight days, a window in said casing displaying one month and concealing the remaining months on the carrier, a second carrier having days of the month thereon, means movably mounting said second carrier, a window in said casing for displaying the days of the month, means for operating said carriers to vary the month and arrangement of the days displayed, means mounting said operating means for rotating and sliding movements, a third carrier, means mounting said third carrier for movement relatively to said second carrier for varying the number of days displayed and means for moving said month carrier transversely and for simultaneously shifting said third carrier with respect to the day of the month carrier in such manner that the number of days displayed will be the number of days in the month displayed.

ELBRIGE GATEWOOD.